US009373066B2

(12) United States Patent
Iwadate

(10) Patent No.: US 9,373,066 B2
(45) Date of Patent: Jun. 21, 2016

(54) IMAGE FORMING APPARATUS CAPABLE OF DISPLAYING THUMBNAIL IMAGE OF A PAGE OF A DOCUMENT DURING A PRINTING PROCESS, INFORMATION PROCESSING APPARATUS, CONTROL METHODS AND STORAGE MEDIA THEREFOR, AND IMAGE FORMING SYSTEM

(71) Applicant: CANON KABUSHIKI KAISHA, Tokyo (JP)

(72) Inventor: Masahiro Iwadate, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/029,972

(22) Filed: Sep. 18, 2013

(65) Prior Publication Data
US 2014/0098399 A1    Apr. 10, 2014

(30) Foreign Application Priority Data

Oct. 10, 2012    (JP) .................................. 2012-225018

(51) Int. Cl.
*G06K 15/00* (2006.01)
*H04N 1/00* (2006.01)
*G06K 15/02* (2006.01)

(52) U.S. Cl.
CPC .............. *G06K 15/40* (2013.01); *G06K 15/005* (2013.01); *G06K 15/1822* (2013.01); *H04N 1/0044* (2013.01); *H04N 1/00233* (2013.01); *H04N 1/00411* (2013.01); *H04N 1/00477* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2003/0156479 A1* | 8/2003 | Fujiyoshi | 365/200 |
| 2005/0280836 A1* | 12/2005 | Ferlitsch | 358/1.16 |
| 2006/0012835 A1* | 1/2006 | Shimizu | 358/1.18 |
| 2006/0050313 A1* | 3/2006 | Hashimoto | G06K 15/002 358/1.15 |
| 2007/0242316 A1* | 10/2007 | Matsushita | 358/1.1 |
| 2008/0178120 A1* | 7/2008 | Yamamoto | 715/838 |
| 2009/0046311 A1* | 2/2009 | Asai | 358/1.9 |
| 2010/0118338 A1* | 5/2010 | Sakiyama et al. | 358/1.15 |
| 2010/0238478 A1* | 9/2010 | Yamada | 358/1.13 |
| 2012/0013944 A1* | 1/2012 | Ehara et al. | 358/1.15 |
| 2013/0013988 A1* | 1/2013 | Yamamoto | 715/201 |
| 2013/0077124 A1* | 3/2013 | Vojak | 358/1.14 |

FOREIGN PATENT DOCUMENTS

JP    2005-204018 A    7/2005

* cited by examiner

*Primary Examiner* — Nicholas Pachol
(74) *Attorney, Agent, or Firm* — Rossi, Kimms & McDowell LLP

(57) ABSTRACT

An image forming apparatus capable of displaying a thumbnail image of a first page of a document to enable a user to easily recognize the document based on the displayed thumbnail image. When determining that a print job received from an information processing apparatus includes page data for generating a thumbnail image of the first page of a document, the image forming apparatus generates the thumbnail image of the first page of the document based on the page data included in the print job and displays the generated thumbnail image on a touch display panel of the image forming apparatus.

13 Claims, 10 Drawing Sheets

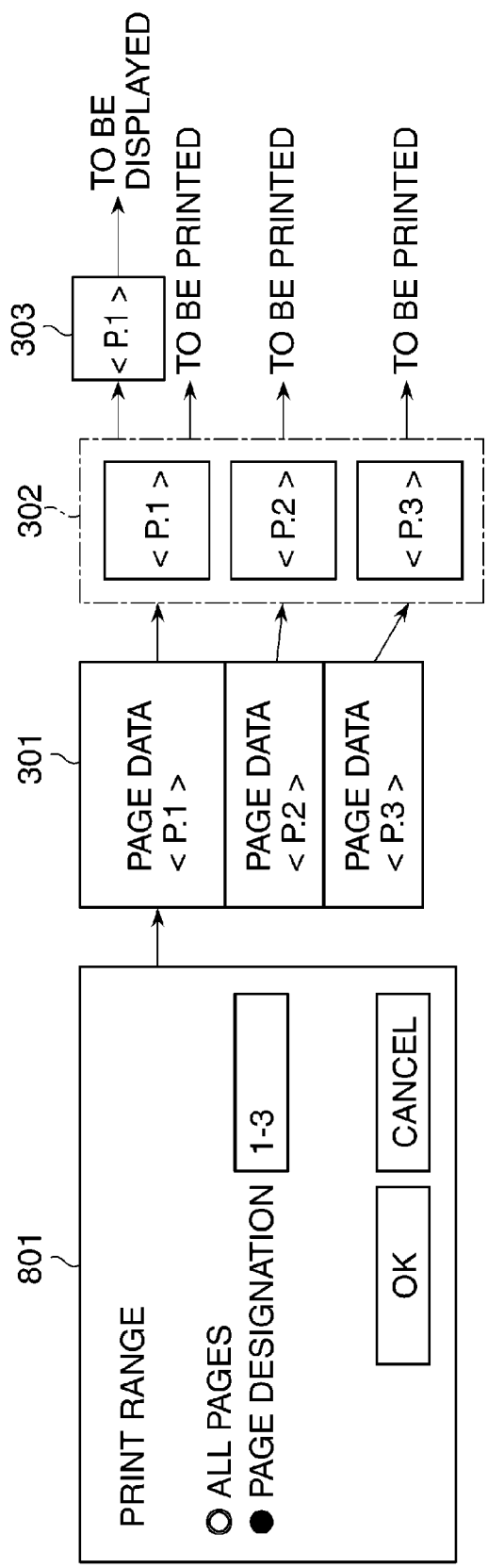

FIG.10

THUMBNAIL DESIGNATION

● THUMBNAIL IMAGE OF TOP PAGE OF ORIGINAL DOCUMENT IS TO BE DISPLAYED.

[ OK ]  [ CANCEL ]

IMAGE FORMING APPARATUS CAPABLE OF DISPLAYING THUMBNAIL IMAGE OF A PAGE OF A DOCUMENT DURING A PRINTING PROCESS, INFORMATION PROCESSING APPARATUS, CONTROL METHODS AND STORAGE MEDIA THEREFOR, AND IMAGE FORMING SYSTEM

BACKGROUND OF THE INVENTION

1. Field of the Invention

The present invention relates to an image forming apparatus capable of displaying a thumbnail image, an information processing apparatus for transmitting print information to the image forming apparatus, control methods and storage media for the apparatuses, and an image forming system that includes the image forming apparatus and the information processing apparatus.

2. Description of the Related Art

Image forming apparatuses have been known in which from image data of an input document a thumbnail image is generated and displayed. Generally, the displayed thumbnail image is a thumbnail image of a top page of the input document. It should be noted that there has been proposed to display a thumbnail image of a page designated by a user (see, for example, Japanese Laid-open Patent Publication No. 2005-204018).

An image forming apparatus sometimes receives and prints a document created by a host. If the host sets a print range that includes the second or subsequent pages of the document, a thumbnail image of a first page in the print range set by the host is displayed by the image forming apparatus. However, even if the print range is set to include the second or subsequent pages, it is sometimes preferable to display a thumbnail image of the top page of the document in order to enable the user to easily select the desired document from among a plurality of documents based on thumbnail images thereof.

In a case where reduction layout printing to print plural pages on a single sheet is set, the image forming apparatus displays a thumbnail image in a reduction layout. However, even in that case, it is sometime preferable to display a thumbnail image of e.g. the top page of the document in a normal size than in the reduction layout in order to enable the user to easily select the desired document.

SUMMARY OF THE INVENTION

The present invention provides an image forming apparatus capable of displaying a thumbnail image of a first page of a document to enable a user to easily recognize the document based on the displayed thumbnail image, an information processing apparatus that transmits print information to the image forming apparatus, control methods and storage media for the apparatuses, and an image forming system including the image forming apparatus and the information processing apparatus.

According to one aspect of this invention, there is provided an image forming apparatus comprising a reception unit configured to receive print information that at least includes print data for printing plural pages of a document, a generation unit configured to generate a thumbnail image based on thumbnail data, which is included in the received print information and corresponds to a first page of the document, and a display unit configured to display the thumbnail image generated by the generation unit.

With this invention, a thumbnail image of the first page of a document is generated and displayed on the display unit of the image forming apparatus. The user can easily recognize the document based on the displayed thumbnail image of the first page of the document.

Further features of the present invention will become apparent from the following description of an exemplary embodiment with reference to the attached drawings.

BRIEF DESCRIPTION OF THE DRAWINGS

FIGS. 7A to 7C are views showing an original document, print job, print image, and thumbnail image generated in the print job transmission process of FIG. 5 or in the print job reception process of FIG. 6, where FIG. 7A shows an original document generated by the information processing apparatus, FIG. 7B shows a print job, print image, and thumbnail image that are generated when a print range including the second or subsequent pages is designated, and FIG. 7C shows a print job, print image, and thumbnail image that are generated when a print range including at least the first page is designated.

FIG. 10 is a view showing an example of a thumbnail designation screen displayed on the touch display panel of the image forming apparatus according to a modification of this invention.

DESCRIPTION OF THE EMBODIMENTS

The present invention will now be described in detail below with reference to the drawings showing a preferred embodiment thereof.

Figure 1:
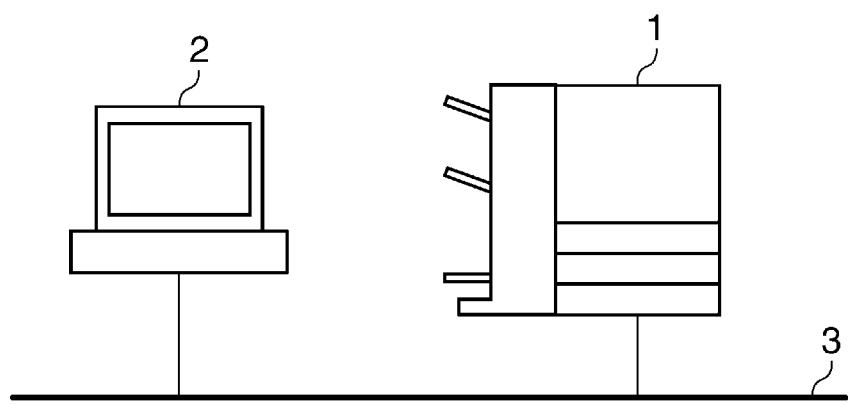
FIG. 1 is a view schematically showing the construction of an image forming system according to one embodiment of this invention.

FIG. 1 schematically shows the construction of an image forming system 100 according to one embodiment of this invention.

In FIG. 1, the image forming system 100 includes one or more image forming apparatuses (one of which is denoted by reference numeral 1) and includes one or more information processing apparatuses (one of which is denoted by reference numeral 2). The image forming apparatuses and the information processing apparatuses are each connected to a network 3.

The information processing apparatus 2 transmits print information (print job) that at least includes page data (print data) for printing at least one page of a document of plural pages. The image forming apparatus 1 receives via the network 3 the print job transmitted from the information processing apparatus 2 and prints the received print job.

Figure 2B:
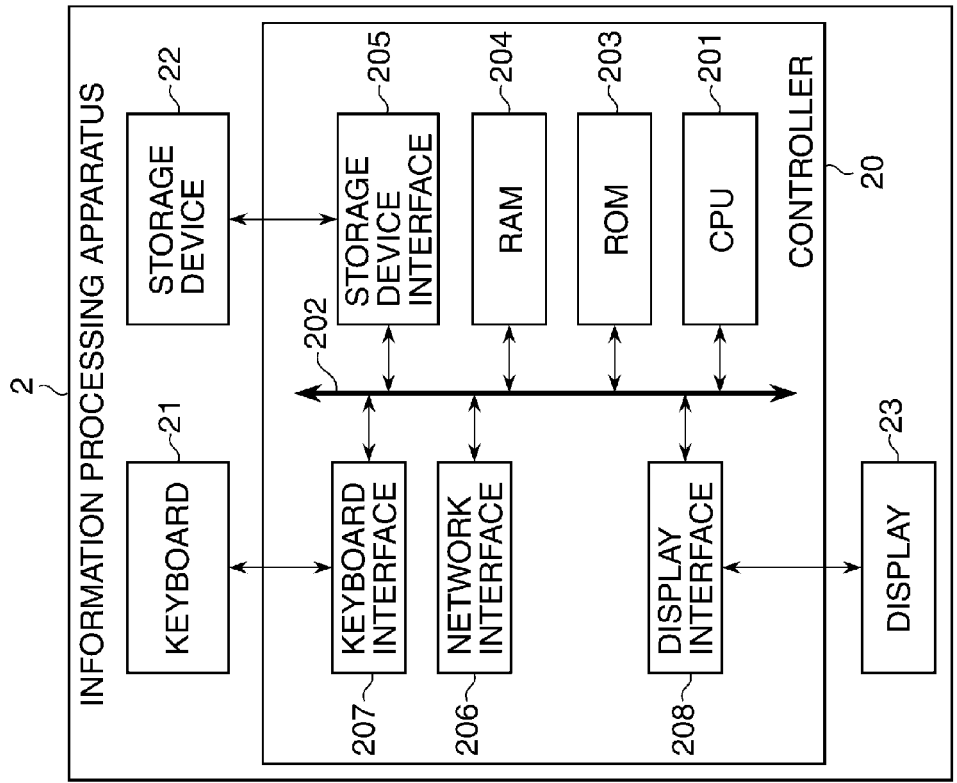
FIG. 2B is a block diagram schematically showing the construction of an information processing apparatus of the image forming system.
Figure 2A:
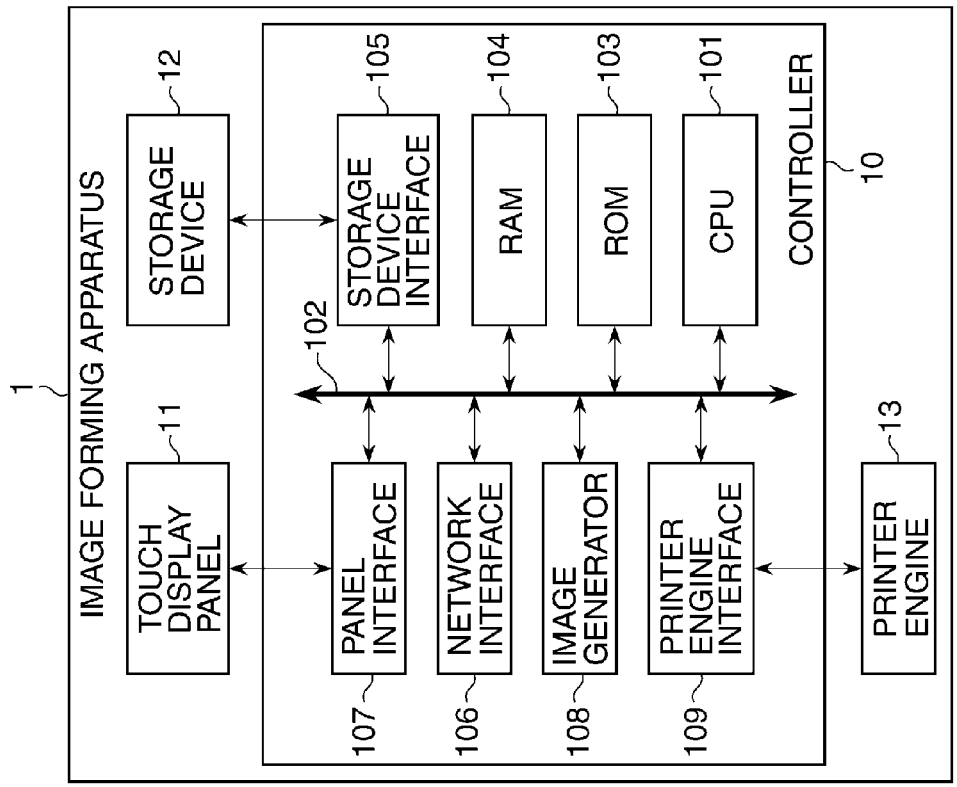
FIG. 2A is a block diagram schematically showing the construction of an image forming apparatus of the image forming system.

FIGS. 2A and 2B show the constructions of the image forming apparatus 1 and the information processing apparatus 2, respectively.

As shown in FIG. 2A, the image forming apparatus 1 includes a controller 10 that controls the entire image forming apparatus, a touch display panel 11 (display unit) that receives a user's instruction and displays an image, a storage device (e.g., HDD) 12 that stores print images, thumbnail images, etc., and a printer engine 13 that performs printing.

The controller 10 includes a CPU 101, ROM. 103, RAM 104, storage device interface 105, network interface 106, panel interface 107, image generator 108, and printer engine interface 109, which are connected to a bus 102.

The CPU 101 controls various parts of the controller 10 according to control programs stored in the ROM 103. The ROM 103 stores the control programs and stores screen information for display on the touch display panel 11. The RAM 104 is used by the CPU 101 as a work area.

The storage device interface 105 transmits and receives data to and from the storage device 12. The network interface 106 transmits and receives data to and from the information processing apparatus 2 via the network 3. The panel interface 107 notifies the CPU 101 of a user's instruction input via the touch display panel 11 and outputs to the touch display panel 11 screen information and thumbnail images stored in any of the ROM 103, RAM 104, and storage device 12.

The image generator 108 generates a print image from page data (print data) contained in the print job received from the information processing apparatus 2. The printer engine interface 109 outputs the print image generated by the image generator 108 to the printer engine 13 according to an instruction from the CPU 101.

As shown in FIG. 2B, the information processing apparatus 2, which is a general-purpose host computer, includes a controller 20 that controls the entire information processing apparatus and includes a keyboard 21, storage device (e.g. HDD) 22, and display 23.

The controller 20 includes a CPU 201, ROM. 203, RAM 204, storage device interface 205, network interface 206, keyboard interface 207, and display interface 208, which are connected to a bus 202.

The CPU 201 controls various parts of the controller 20 according to control programs stored in the ROM 203 or in the storage device 22. The ROM 203 stores the control programs and various information. The RAM. 204 is used by the CPU 201 as a work area.

The storage device interface 205 transmits and receives data to and from the storage device 22. The network interface 206 transmits and receives data to and from the image forming apparatus 1 via the network 3. The keyboard interface 207 notifies the CPU 201 of a user's instruction input from the keyboard 21. The display interface 208 outputs screen information to the display 23 according to an instruction from the CPU 201.

The information processing apparatus 2 is capable of generating a document by using application software stored in the storage device 22 and capable of generating a print job from the generated document by using a printer driver stored in the storage device 22. The information processing apparatus 2 outputs the print job to the image forming apparatus 1.

Figure 3:
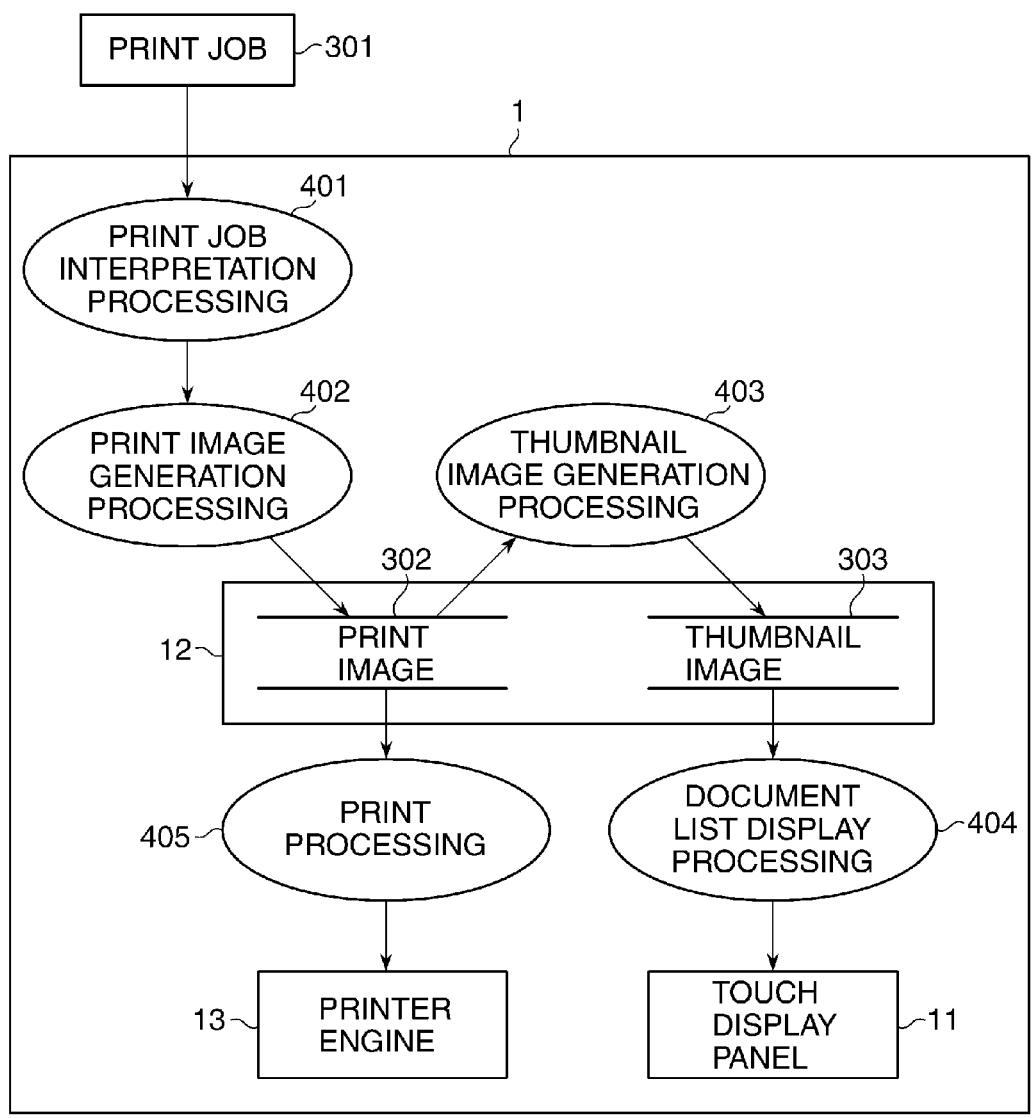
FIG. 3 a view showing data flow from receiving from the information processing apparatus a print job by the image forming apparatus to generating and outputting a print image and a thumbnail image.

FIG. 3 shows data flow from receiving from the information processing apparatus 2 a print job by the image forming apparatus 1 to generating and outputting a print image and a thumbnail image. In FIG. 3, ellipsoids each denote processing, parallel straight line pairs each denote data, and arrows each denote the flow of data.

When the image forming apparatus 1 receives at the network interface 106 a print job 301 from the information processing apparatus 2, the CPU 101 of the image forming apparatus 1 starts print job interpretation processing 401 to interpret the received print job 301. Next, the CPU 101 starts print image generation processing 402 and supplies page data obtained by interpreting the print job 301 to the image generator 108 where a print image 302 is generated. The generated print image 302 is stored into the storage device 12.

When determining that a thumbnail image is to be generated, the CPU 101 starts thumbnail image generation processing 403 to generate from the print image 302 stored in the storage device 12 a thumbnail image 303 that is reduced in size for display. The generated thumbnail image 303 is stored into the storage device 12.

When receiving via the touch display panel 11 an instruction for display of a document list, the CPU 101 starts document list display processing 404 to cause the touch display panel 11 to display thumbnail images 303 of documents corresponding to print images stored in the storage device 12.

Figure 4:
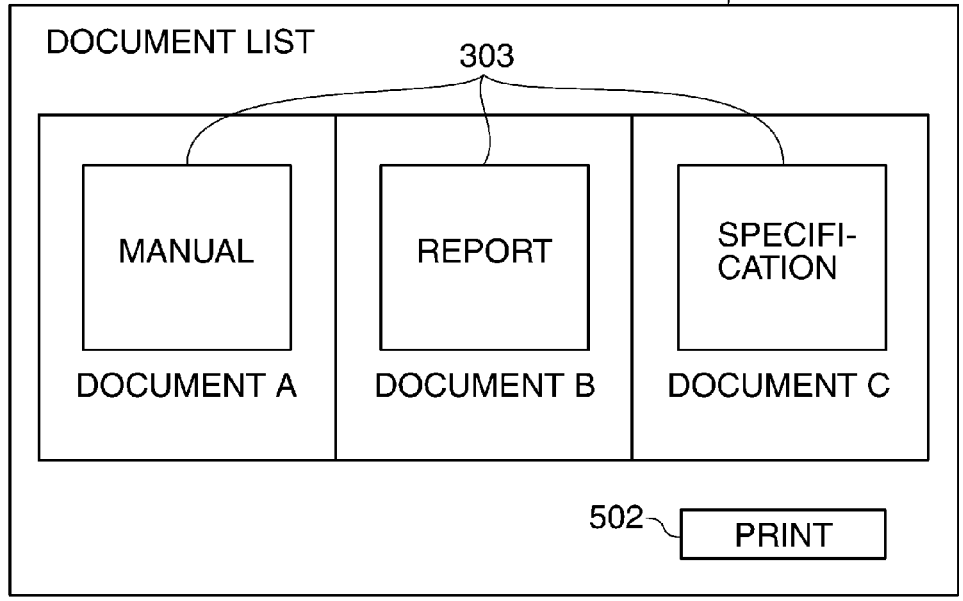
FIG. 4 is a view showing an example of a document list screen displayed on a touch display panel of the image forming apparatus.

FIG. 4 shows an example of a document list screen 501 displayed on the touch display panel 11.

Referring to FIG. 4, thumbnail images 303 of e.g. documents A to C are displayed on the document list screen 501. When any of the thumbnail images 303 is selected on the document list screen 501 and then a print key 502 is pressed, the CPU 101 starts print processing 405 of FIG. 3 to read from the storage device 12 a print image 302 of the selected document and output the print image 302 for printing to the printer engine 13.

In the following, descriptions will be sequentially given of processes performed by the image forming apparatus 1 and the information processing apparatus 2 according to the print range being designated by the information processing apparatus 2 (which will be referred to as the range of to-be-printed pages or referred to as the range of print pages) and processes performed by the image forming apparatus 1 and the information processing apparatus 2 according to the presence/absence of designation of reduction layout printing by the information processing apparatus 2.

Figure 5:
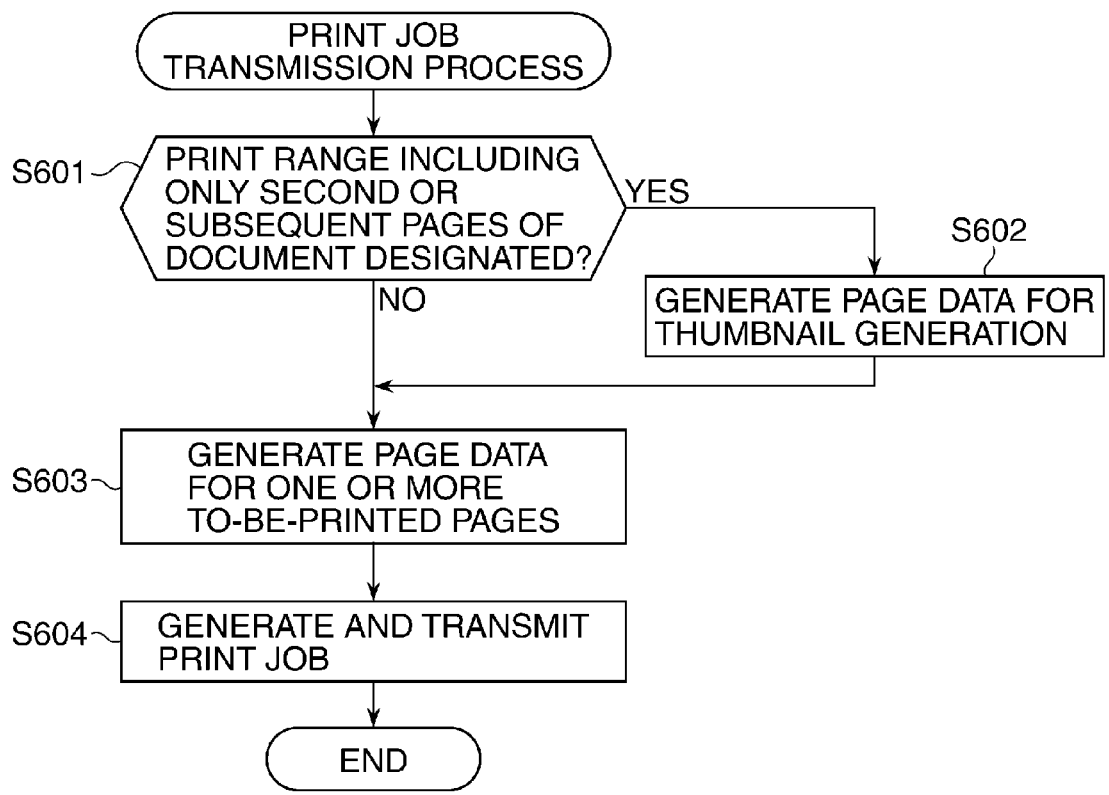
FIG. 5 is a flowchart showing the procedures of a print job transmission process performed by a CPU of the information processing apparatus according to a designated print range in response to a document print instruction.

FIG. 5 shows in flowchart the procedures of a print job transmission process performed by the CPU 201 of the information processing apparatus 2 in response to a document print instruction. By means of the printer driver that generates a print job 301 (FIG. 3), the print job transmission process is performed according to the print range designated by the information processing apparatus 2.

Referring to FIG. 5, the CPU 201 determines whether or not the print range including only the second or subsequent pages of the document is designated on a print range designation screen (denoted by reference numeral 801 in FIGS. 7B and 7C) of the printer driver (step S601). Step S601 corresponds to a determination unit of this invention that determines whether or not the first page of the document is included in the range of to-be-printed pages that is designated to cause the image forming apparatus to print at least one page of the document.

If determined that the print range not including only the second or subsequent pages of the document is designated (NO to step S601), the process proceeds to step S603. On the other hand, if determined that the print range including only the second or subsequent pages of the document is designated (YES to step S601), the CPU 201 generates page data for the first page of the document serving as page data for thumbnail generation, which is thumbnail data for generating a thumbnail image of the first page of the document (step S602), whereupon the process proceeds to step S603.

In step S603, the CPU 201 generates page data for one or more to-be-printed pages that are included in the designated print range.

Next, the CPU 201 generates a print job (denoted by reference numeral 301 in FIG. 3) based on the page data for thumbnail generation generated in step S602 and the page data for one or more to-be-printed pages generated in step S603 or based on only the page data for one or more to-be-printed pages generated in step S603, and transmits the generated print job 301 to the image forming apparatus 1 via the network interface 206 (step S604), whereupon the present process is completed.

As described above, the information processing apparatus 2 generates the page data for thumbnail generation in step S602 and adds it to the print job 301 only when the print range including only the second or subsequent pages of the document is designated.

Step S604 corresponds to a transmission unit of this invention that is configured, in a case where it is determined that the range of to-be-printed pages designated to cause the image forming apparatus to print at least one page of the document does not include the first page of the document, to transmit a print job (print information) that includes print data for to-be-printed pages and thumbnail data for generating the thumbnail image of the first page of the document.

Figure 6:
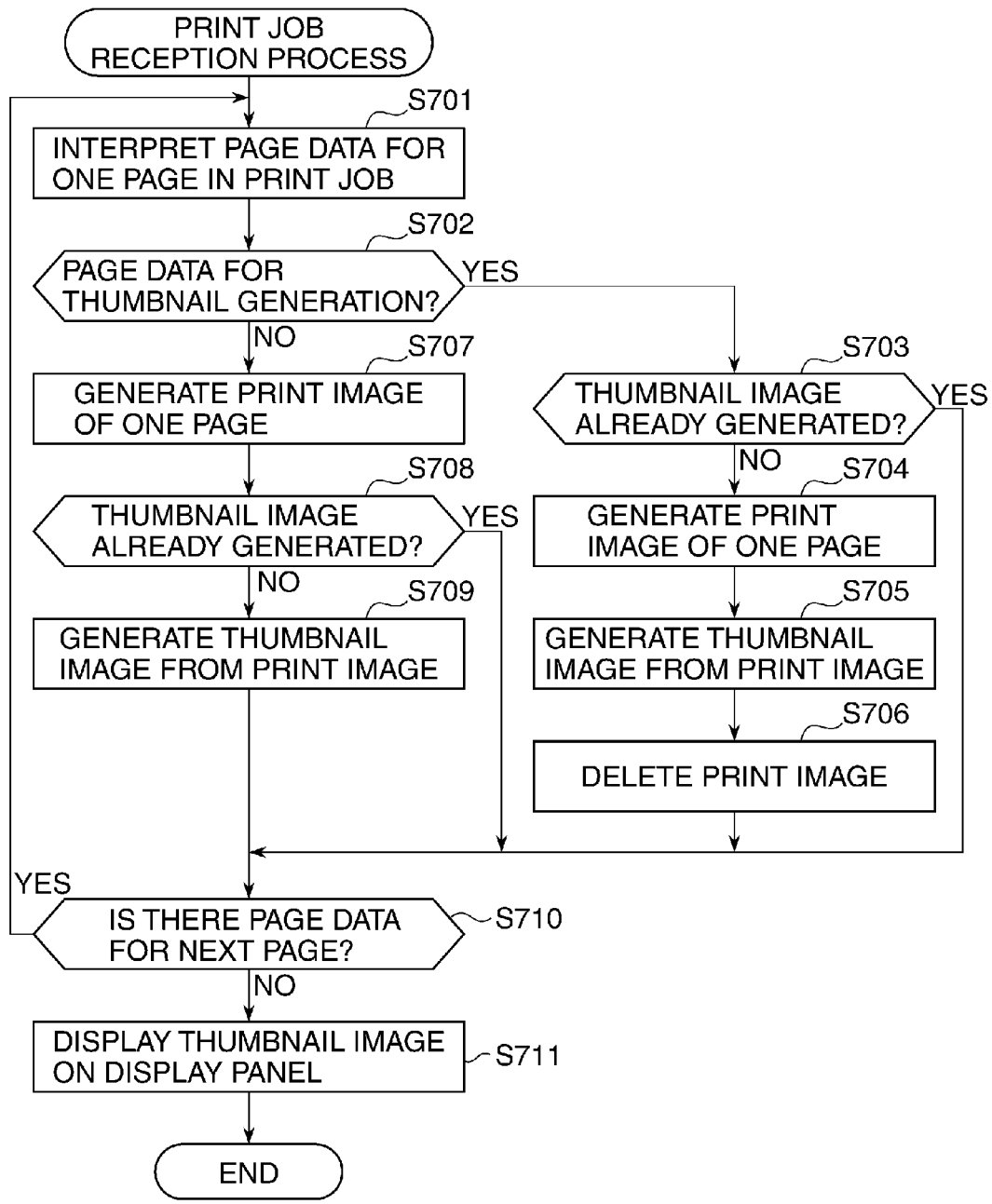
FIG. 6 is a flowchart showing the procedures of a print job reception process performed by a CPU of the image forming apparatus.

FIG. 6 shows in flowchart the procedures of a print job reception process performed by the CPU 101 of the image forming apparatus 1. This print job reception process is performed by the CPU 101 by starting the print job interpretation processing 401, print image generation processing 402, and thumbnail image generation processing 403 which are shown in FIG. 3 in response to the print job 301 being input from the information processing apparatus 2.

Referring to FIG. 6, the CPU 101 inputs the print job 301 received by the network interface 106 from the information processing apparatus 2, interprets page data for one page among document pages included in the print job 301 (step S701), and determines whether or not the interpreted page data is page data for thumbnail generation (step S702). Step S702 corresponds to a determination unit of this invention that determines whether or not the print information includes thumbnail data for generating a thumbnail image of the first page of the document.

If determined that the page data interpreted in step S701 is page data for thumbnail generation (YES to step S702), the CPU 101 determines whether or not a thumbnail image corresponding to the page data has been already generated (step S703).

If determined that the thumbnail image has been generated (YES to step S703), the process proceeds to step S710. On the other hand, if determined that the thumbnail image has not been generated (NO to step S703), the CPU 101 supplies page data for thumbnail generation to the image generator 108 to cause the generator 108 to generate a print image of one page (step S704).

Next, the CPU 101 generates a thumbnail image reduced in size for display from the print image of one page generated by the image generator 108 and stores the generated thumbnail image into the storage device 12 (step S705). Step S705 corresponds to a generation unit of this invention that is configured, in a case where it is determined that the print information includes the thumbnail data, to generate a thumbnail image of the first page of the document by using the thumbnail data.

After the thumbnail image is generated, the print image for the first page of the document generated in step S704 by the image generator 108 is no longer necessary, and therefore the CPU 101 deletes the print image (step S706), whereupon the process proceeds to step S710.

If determined that the page data interpreted in step S701 is not page data for thumbnail generation (NO to step S702), the CPU 101 supplies the page data to the image generator 108 to cause the generator 108 to generate a print image of one page (step S707), and determines whether or not a thumbnail image corresponding to the generated print image has already been generated (step S708).

If determined that the thumbnail image has been generated (YES to step S708), the process proceeds to step S710. On the other hand, if determined that the thumbnail image has not been generated (NO to step S708), the CPU 101 generates from the print image of one page generated by the image generator 108 a thumbnail image reduced in size for display and stores the generated thumbnail image into the storage device 12 (step S709), whereupon the process proceeds to step S710.

In step S710, the CPU 101 determines whether or not there is page data for the next page of the document. If determined that page data for the next page is present (YES to step S710), the CPU 101 returns to step S701 where it interprets the page data for the next page. On the other hand, if determined that page data for the next page is not present (NO to step S710), the CPU 101 causes, in step S711, the touch display panel 11 (display unit) to display the thumbnail image of the first page among thumbnail images of to-be-printed pages generated in repeatedly executed step S709 or to display the thumbnail image of the first page generated in step S705, whereupon the present process is completed. Step S711 corresponds to a display control unit of this invention that controls a display unit of the image forming apparatus to display the generated thumbnail image.

It should be noted that although only the thumbnail image of the first page is displayed on the touch display panel 11 in the present example, it is possible to display desired ones of the thumbnail images of to-be-printed pages (including the first page) generated in step S709 or display the thumbnail image of the first page generated in step S705 and desired ones of the thumbnail images generated in step S709.

According to the print job transmission process of FIG. 5, the information processing apparatus 2 generates a print job including page data for to-be-printed pages and transmits the generated print job to the image forming apparatus 1, if the range of print pages includes the first page of the document, whereas it generates a print job including page data for thumbnail generation (corresponding to page data for the first page of the document) and page data for to-be-printed pages and transmits the generated print job, if the range of print pages does not include the first page of the document.

According to the print job reception process of FIG. 6, the image forming apparatus 1 generates the thumbnail image of the first page from page data and displays the generated thumbnail image on the touch display panel 11, if the print job received from the information processing apparatus 2 includes page data for the first page of the document. On the other hand, if the print job does not include page data for the first page of the document, the image forming apparatus 1 generates the thumbnail image of the first page by using page data for thumbnail generation (corresponding to the page data for the first page) included in the print job and displays the generated thumbnail image on the touch display panel 11. In other words, irrespective of whether the range of print pages includes the first page of the document, the thumbnail image of the first page of the document is generated and displayed. Accordingly, it becomes possible for the user to easily recognize the document based on the thumbnail image of the first page of the document displayed on the touch display panel 11.

Figure 7A:
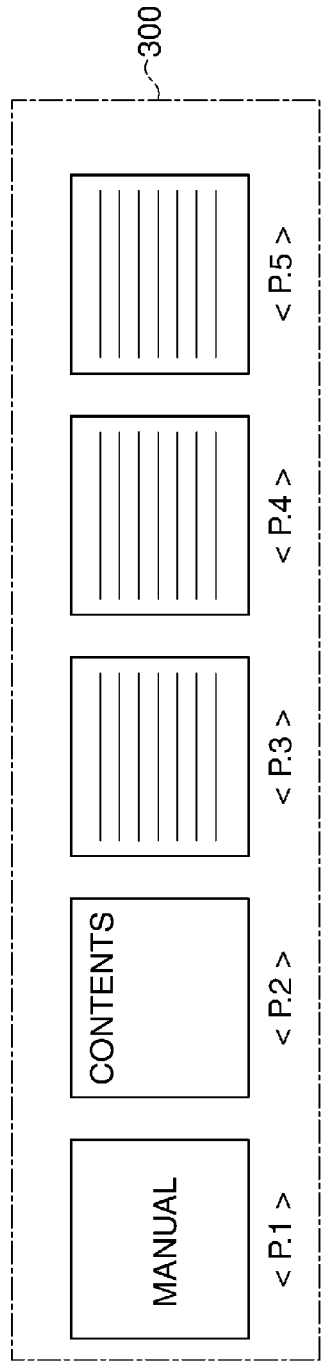
Figure 7B:
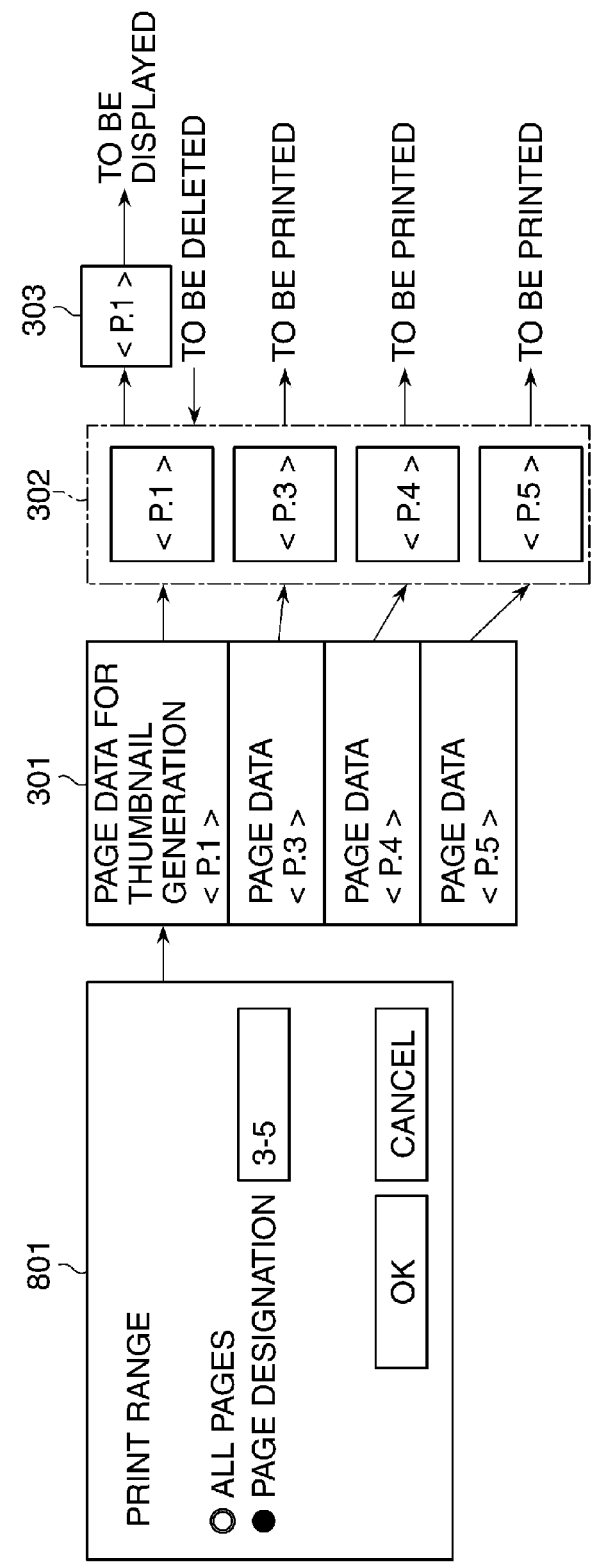

FIGS. 7A to 7C show an original document, print job, print image, and thumbnail image generated in the print job transmission process of FIG. 5 or in the print job reception process of FIG. 6. It should be noted that in FIGS. 7A to 7C, symbol P. N represents the N-th page.

FIG. 7A shows an original document 300 generated by application software of the information processing apparatus 2. FIG. 7B shows a print job 301, print image 302, and thumbnail image 303 that are generated when a print range including the second or subsequent pages (third to fifth pages in the illustrated example) is designated. FIG. 7C shows a print job 301, print image 302, and thumbnail image 303 generated when a print range including at least the first page (first to third pages in the illustrated example) is designated.

In a case, for example, that a print range including the third to fifth pages of the original document 300 is designated on a print range designation screen 801 of the printer driver as shown in FIG. 7B, it is determined in step S601 of the print job transmission process of FIG. 5 that a print range including only the second or subsequent pages is designated. Accordingly, a print job 301 including page data for the third to fifth pages to be printed and page data for the first page (which is page data for thumbnail generation) is generated from the original document 300 by the printer driver of the information processing apparatus 2. The generated print job 301 is transmitted from the information processing apparatus 2 to the image forming apparatus 1.

In the print job reception process of FIG. 6, a print image 302 including as shown in FIG. 7B a print image of the first page for thumbnail generation and print images of the third to fifth pages to be printed is generated based on the print job 301. From the print image of the first page for thumbnail generation, a thumbnail image 303 of the first page of the document is generated in step S705 of FIG. 6. After the thumbnail image 303 is generated, the print image of the first page for thumbnail generation is deleted in step S706.

On the other hand, a print range including the first to third pages of the original document 300 is designated on the print range designation screen 801 as shown in FIG. 7C, the answer to step S601 in FIG. 5 becomes negative (NO). Thus, a print job 301 not including page data for thumbnail generation but including only page data for the first to third pages to be printed is generated from the original document 300 by the information processing apparatus 2, and the generated print job 301 is transmitted to the image forming apparatus 1.

In the print job reception process of FIG. 6, a print image 302 only including as shown in FIG. 7C print images of the first to third pages to be printed is generated based on the print job 301. Since the print job 301 does not include page data for thumbnail image, a thumbnail image 303 of the first page of the document is generated in step S709 of FIG. 6 from the print image of the first page of the original document 300, which is the top page of the print range.

As described above, when the print range not including the first page of a document is designated, page data for the first page is generated as the page data for thumbnail generation and added to a print job in the print job transmission process of FIG. 5. Thus, in the print job reception process of FIG. 6, the thumbnail image of the first page of the original document is displayed on the document list screen 501 of the touch display panel 11 irrespective of the designated print range. The user can easily recognize the desired document among one or more documents based on thumbnail images of first pages of the documents, which are displayed on the screen 501.

Next, a description will be given of processes performed by the image forming apparatus 1 and the information processing apparatus 2 according to the presence/absence of designation of reduction layout printing in the information processing apparatus 2.

Figure 8:
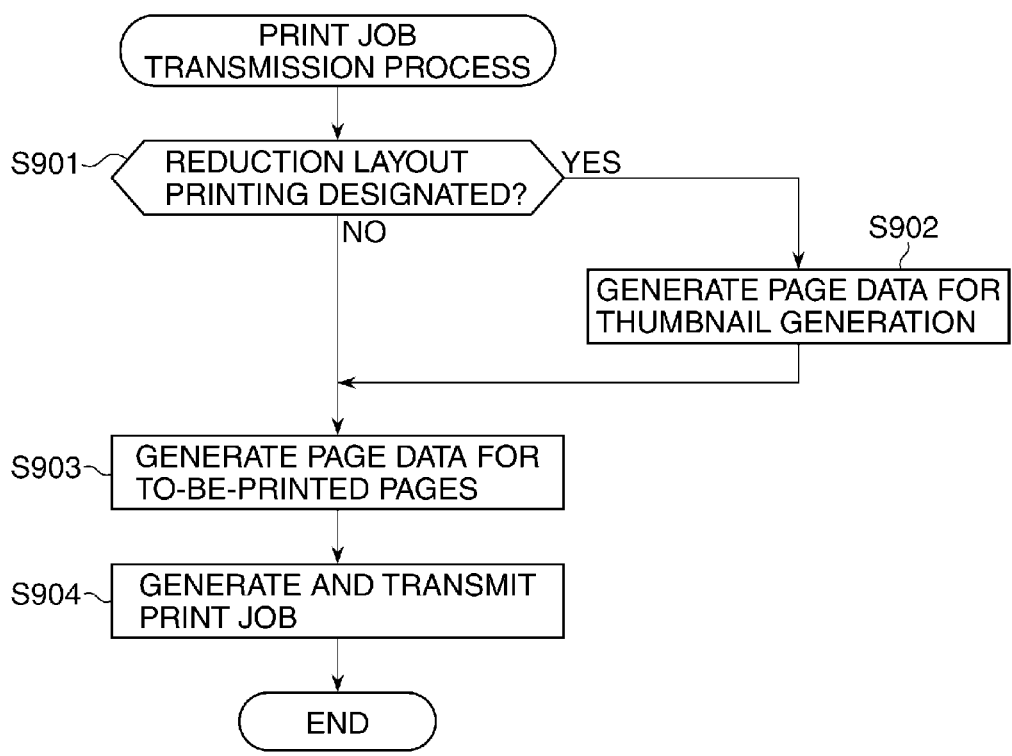
FIG. 8 is a flowchart showing the procedures of a print job transmission process performed in response to a document print instruction by the CPU of the information processing apparatus according to the presence/absence of designation of reduction layout printing.

FIG. 8 shows the procedures of a print job transmission process performed by the CPU 201 of the information processing apparatus 2 in response to a document print instruction. The print job transmission process is performed by using the printer driver according to the presence/absence of designation of reduction layout printing in the information processing apparatus 2. In the reduction layout printing, plural pages are printed on a single sheet.

Referring to FIG. 8, the CPU 201 determines whether or not reduction layout printing has been designated on a page layout designation screen of the printer driver (step S901). Step S901 corresponds to a determination unit of this invention that is configured, when a document of plural pages is printed by the image forming apparatus, to determine whether or not reduction layout printing has been designated.

If determined that reduction layout printing has not been designated (NO to step S901), the process proceeds to step S903. On the other hand, if determined that reduction layout printing has been designated (YES to step S901), the CPU 201 generates page data for the first page as page data for thumbnail generation, which is thumbnail data for generating a thumbnail image of the first page of the document (step S902), and proceeds to step S903.

In step S903, the CPU 201 generates page data for to-be-printed pages included in the designated print range.

Next, the CPU 201 generates a print job based on the page data for thumbnail generation generated in step S902 and the page data for to-be-printed pages generated in step S903 or based on only the page data for to-be-printed pages generated in step S903, and transmits the generated print job to the image forming apparatus 1 via the network interface 206 (step S904), whereupon the present process is completed.

Step S904 corresponds to a transmission unit of this invention that is configured, in a case where it is determined that reduction layout printing has been designated, to transmit print information that includes print data for to-be-printed pages and thumbnail data for generating a thumbnail image of the first page of the document.

When receiving the print job from the information processing apparatus 2, the image forming apparatus 1 performs the print job reception process that has already been described with reference to FIG. 6.

Figure 9:
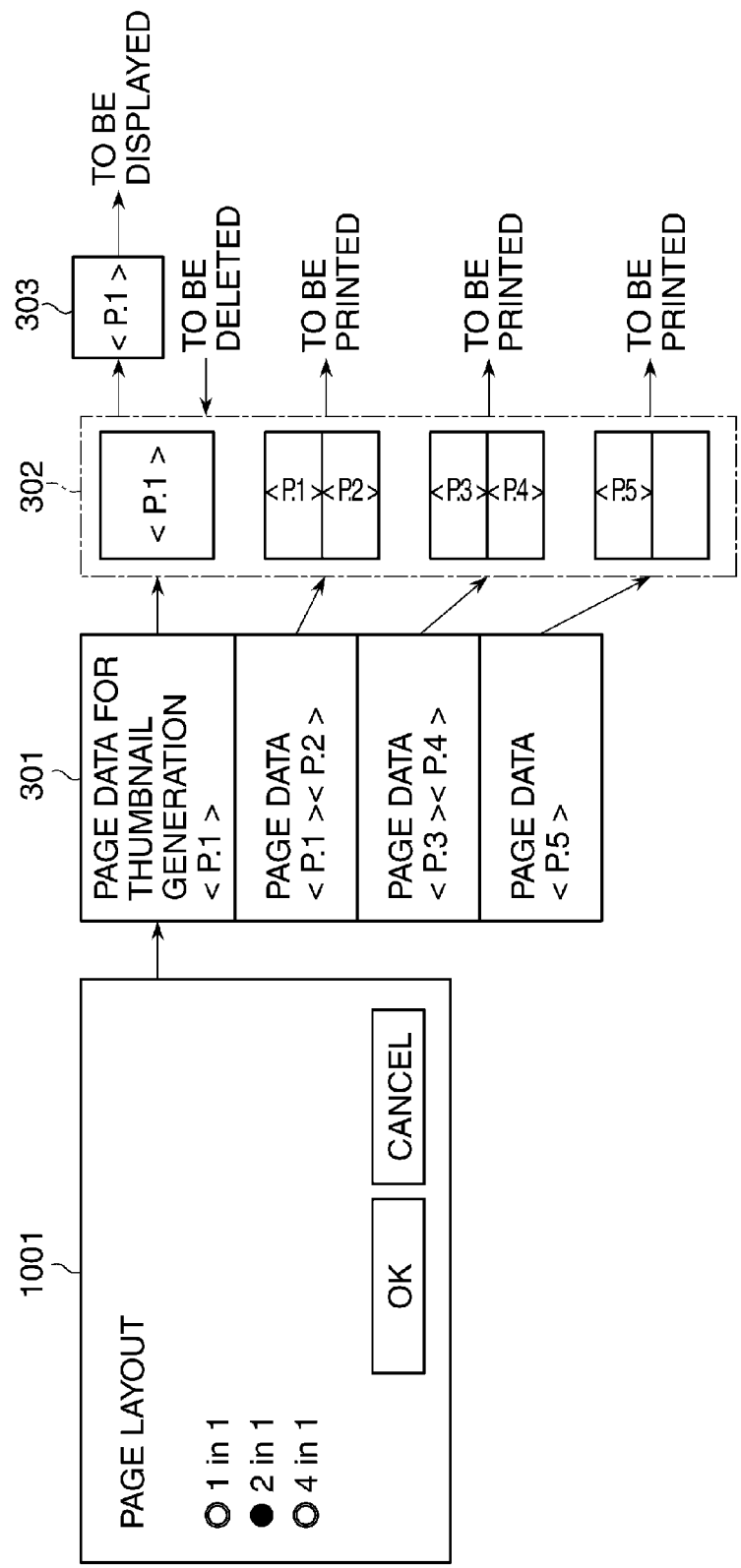
FIG. 9 is a view showing a print job, print image, and thumbnail image generated in the print job transmission process of FIG. 8 or in the print job reception process of FIG. 6 when reduction layout printing is designated.

FIG. 9 shows a print job, print image, and thumbnail image generated in the print job transmission process of FIG. 8 or in the print job reception process of FIG. 6 when reduction layout printing is designated in the information processing apparatus 2.

In the example of FIG. 9, two-in-one printing to print two pages on a single sheet is designated on a page layout designation screen 1001 of the printer driver.

In that case, the answer to step S901 in the print job transmission process of FIG. 8 that determines whether or not reduction layout printing has been designated becomes affirmative (YES). Accordingly, a print job 301 including page data for performing two-in-one printing of to-be-printed pages (e.g., first to fifth pages) and including page data for the first page (which is page data for thumbnail generation) is generated by the printer driver of the information processing apparatus 2. The print job 301 is transmitted from the information processing apparatus 2 to the image forming apparatus 1.

In the print job reception process of FIG. 6, a print image 302 shown in FIG. 9 is generated that includes a print image of the first page for thumbnail generation and includes print images for performing two-in-one printing of the first to fifth pages. Then, from the print image of the first page for thumbnail generation, a thumbnail image 303 of the first page of the document is generated in step S705 of FIG. 6. The print image of the first page for thumbnail generation is deleted in step S706 after the thumbnail image is generated.

As described above, in a case where reduction layout printing has been designated, page data for the first page as the page data for thumbnail generation is generated and added to a print job in the print job transmission process of FIG. 8. Accordingly, in the print job reception process of FIG. 6, a thumbnail image of the first page of the original document for reduction layout printing is displayed on the document list screen 501 of the touch display panel 11. The user can easily recognize the desired document among one or more documents based on thumbnail images of first pages of the documents, which are displayed on the screen 501.

In the above embodiment, if a print job received from the information processing apparatus 2 includes page data for thumbnail generation, the image forming apparatus 1 generates a thumbnail image of the first page of a document from a print image generated from the page data for thumbnail generation, and displays the generated thumbnail image on the touch display panel 11, but this is not inevitably necessary.

In the following, a description will be given of a modification where the image forming apparatus 1 selectively performs the generation and display of a thumbnail image of the first page of a document based on page data for thumbnail generation.

FIG. 10 shows a thumbnail designation screen 1101 displayed on the touch display panel 11 of the image forming apparatus 1.

Referring to FIG. 10, there is displayed on the thumbnail designation screen 1101 a radio button to select whether or not a thumbnail image of the top page of the original document is to be displayed. In a case where it is determined that a print job includes page data for thumbnail generation, a thumbnail image of the first page of the document is generated and displayed on the touch display panel 11 when the radio button is checked and then an OK button is pressed. On the other hand, in a case that the radio button is unchecked, a thumbnail image of the first page of the document is neither generated nor displayed, even if it is determined that a print job includes page data for thumbnail generation. In that case, a thumbnail image of the top page of the print range is displayed on the touch display panel 11.

According to the above-described modification, the user can select which one of the thumbnail image of the top page of the original document and the thumbnail image of the top page of the print range is to be displayed on the document list screen 501, whereby the usability of the image forming system can be improved.

In the above-described embodiment, if it is determined in the print job transmission process of FIG. 5 that a print range including only the second or subsequent pages of a document is designated, page data for the first page of the document is generated as the page data for thumbnail generation and added to the print job, but this is not inevitably necessary.

In the following, a description will be given of a modification where page data for thumbnail can selectively be generated and added to a print job by the information processing apparatus 2.

In this modification, the information processing apparatus 2 is configured to display on the display 23 a screen similar to the thumbnail designation screen 1101 of FIG. 10. The user can selectively make a setting on the screen such that a thumbnail image of the first page of a document is not displayed. In a case where the setting is made such that no thumbnail image of the first page of the document is to be displayed, a print job not including page data for thumbnail generation is transmitted, even if it is determined that the print range does not include the first page of the document.

According to this modification, the user can select which one of a thumbnail image of the top page of the original document and a thumbnail image of the top page of a print range is to be displayed on the document list screen 501, whereby the usability of the image forming system can be improved.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-225018, filed Oct. 10, 2012, which is hereby incorporated by reference herein in its entirety.

What is claimed is:

1. An image forming apparatus comprising:
a storage device; and
a processor configured to execute computer executable instructions recorded on the storage device, the computer executable instructions including instructions, that when executed by the processor, cause the image forming apparatus to:
receive print information that at least includes plural pages of a document from an information processing apparatus, wherein the plural pages include to-be-printed pages of the document designated by a user through the information processing apparatus and a top page of the document used for displaying but not for printing, and wherein the print information is received from the information processing apparatus in a case where the top page is not designated as one of the to-be-printed pages;

generate image data based on the print information including the plural pages of the document, the generated image data including image data corresponding to the to-be-printed pages of the document and image data corresponding to the top page of the document;

generate a thumbnail image based on the image data corresponding to the top page of the document and delete, without printing, the image data corresponding to the top page of the document after the thumbnail image is generated;

display the generated thumbnail image; and print the image data corresponding to the to-be-printed pages of the document.

2. The image forming apparatus according to claim 1, wherein the computer executable instructions further include instructions, that when executed by the processor, cause the image forming apparatus to:

generate, in a case where the print information does not include the top page of the document, a thumbnail image based on the image data corresponding to one of the to-be-printed pages of the document; and decide whether to display the thumbnail image generated based on the image data corresponding to the one of the to-be-printed pages or to display the thumbnail image generated based on the image data corresponding to the top page of the document.

3. An information processing apparatus for transmitting print information that at least includes plural pages of a document to an image forming apparatus, comprising:

a storage device; and a processor configured to execute computer executable instructions recorded on the storage device, the computer executable instructions including instructions, that when executed by the processor, cause the information processing apparatus to:

designate to-be-printed pages of the document;

determine whether or not a top page of the document is designated as one of the to-be-printed pages of the document;

set a top page of the plural pages of the document as a page used for displaying but not printing, thereby causing image data corresponding to the top page to be generated, a thumbnail image to be generated based on the generated image data, and the generated image data to be deleted, without being printed, after the thumbnail image is generated, in a case where it is determined that the top page of the document is not designated as the one of the to-be-printed pages of the document; and transmit, to the image forming apparatus, the print information including the to-be-printed pages of the document in a case where it is determined that the top page of the document is designated as the one of the to-be-printed pages of the document, and transmit, to the image forming apparatus, the print information including the to-be-printed pages of the document and the top page of the document set as the page used for displaying but not printing, in the case where it is determined that the top page of the document is not designated as the one of the to-be-printed pages of the document.

4. The information processing apparatus according to claim 3, wherein the information processing apparatus is caused to transmit, even if it is determined that the top page of the document is not designated as the one of the to-be-printed pages of the document, print information that does not include the top page of the document set as the page used for displaying but not printing in a case where a setting is made such that a thumbnail image of the top page of the document is not to be displayed.

5. An information processing apparatus for transmitting print information that at least includes print data for printing plural pages of a document to an image forming apparatus, comprising:

a storage device; and a processor configured to execute computer executable instructions recorded on the storage device, the computer executable instructions including instructions, that when executed by the processor, cause the information processing apparatus to:

determine, when at least one page of the document is printed by the image forming apparatus, whether or not reduction layout printing to print plural pages on a single sheet has been designated; and transmit, in a case where it is determined that the reduction layout printing has been designated, print information that includes to-be-printed pages of the document and a top page of the plural pages of the document, set as a page used for displaying but not for printing, thereby causing image data corresponding to the top page to be generated, a non-reduction layout thumbnail image to be generated based on the generated image data, and the generated image data to be deleted, without being printed, after the non-reduction layout thumbnail image is generated.

6. An image forming system having an image forming apparatus and an information processing apparatus for transmitting print information that at least includes plural pages of a document, wherein:

the image forming apparatus includes:

a storage device; and a processor configured to execute computer executable instructions recorded on the storage device, the computer executable instructions including instructions, that when executed by the processor, cause the image forming apparatus to:

receive the print information from the information processing apparatus, wherein the plural pages include to-be-printed pages of the document designated by a user through the information processing apparatus and a top page of the document used for displaying but not for printing, and wherein the print information is received from the information processing apparatus in a case where the top page is not designated as one of the to-be-printed pages, generate image data based on the print information including the plural pages of the document, the generated image data including image data corresponding to the to-be-printed pages of the document and image data corresponding to the top page of the document, generate a thumbnail image based on the image data corresponding to the top page of the document and delete, without printing, the image data corresponding to the top page of the document after the thumbnail image is generated, display the generated thumbnail image, and print the image data corresponding to the to-be-printed pages of the document; and the information processing apparatus includes:

a storage device; and a processor configured to execute computer executable instructions recorded on the storage device, the computer executable instructions including instructions, that when executed by the processor, cause the information processing apparatus to:

designate to-be-printed pages of the document, determine whether or not the top page of the document is designated as one of the to-be-printed pages of the document, set a top page of the plural pages of the document as a page used for displaying but not printing, in a case where it is determined that the top page of the document is not designated as the one of the to-be-printed pages of the document, and transmit, to the image forming apparatus, the print information including the to-be-printed pages of the document in a case where it is determined that the top page of the document is designated as the one of the to-be-printed pages of the document, and transmit, to the image forming apparatus, the print information including the to-be-printed pages of the document and the top page of the document set as the page used for displaying but not printing, in the case where it is determined that the top page of the document is not designated as the one of the to-be-printed pages of the document.

7. An image forming system having an image forming apparatus and an information processing apparatus for transmitting print information that at least includes plural pages of a document, wherein:

the image forming apparatus includes:

a storage device; and a processor configured to execute computer executable instructions recorded on the storage device, the computer executable instructions including instructions, that when executed by the processor, cause the image forming apparatus to:

receive the print information from the information processing apparatus, wherein the plural pages include to-be-printed pages of the document designated by a user through the information processing apparatus and a top page of the document used for displaying but not for printing, and wherein the print information is received from the information processing apparatus in a case where the top page is not designated as one of the to-be-printed pages, generate image data based on the print information including the plural pages of the document, the generated image data including image data corresponding to the to-be-printed pages of the document and image data corresponding to the top page of the document, generate a non-reduction layout thumbnail image based on the image data corresponding to the top page of the document and delete, without printing, the image data corresponding to the top page of the document after the non-reduction layout thumbnail image is generated, display the generated non-reduction layout thumbnail image, and print the image data corresponding to the to-be-printed pages of the document; and the information processing apparatus includes:

a storage device; and a processor configured to execute computer executable instructions recorded on the storage device, the computer executable instructions including instructions, that when executed by the processor, cause the information processing apparatus to:

determine, when at least one page of the document is printed by the image forming apparatus, whether or not reduction layout printing to print plural pages on a single sheet has been designated, and transmit, in a case where it is determined that the reduction layout printing has been designated, print information that includes to-be-printed pages of the document and a top page of the plural pages of the document, set as a page used for displaying but not for printing, for generating a non-reduction layout thumbnail image.

8. A control method for an image forming apparatus, comprising:

receiving print information that at least includes plural pages of a document from an information processing apparatus, wherein the plural pages include to-be-printed pages of the document designated by a user through the information processing apparatus and a top page of the document used for displaying but not for printing, and wherein the print information is received from the information processing apparatus in a case where the top page is not designated as one of the to-be-printed pages;

generating image data based on the print information including the plural pages of the document, the generated image data including image data corresponding to the to-be-printed pages of the document and image data corresponding to the top page of the document;

generating a thumbnail image based on the image data corresponding to the top page of the document and deleting, without printing, the image data corresponding to the top page of the document after the thumbnail image is generated;

displaying the generated thumbnail image; and printing the image data corresponding to the to-be-printed pages of the document.

9. A non-transitory computer-readable storage medium storing a program to execute a control method for an image forming apparatus, the method comprising:

receiving print information that at least includes plural pages of a document from an information processing apparatus, wherein the plural pages include to-be-printed pages of the document designated by a user through the information processing apparatus and a top page of the document used for displaying but not for printing, and wherein the print information is received from the information processing apparatus in a case where the top page is not designated as one of the to-be-printed pages;

generating image data based on the print information including the plural pages of the document, the generated image data including image data corresponding to the to-be-printed pages of the document and image data corresponding to the top page of the document;

generating a thumbnail image based on the image data corresponding to the top page of the document and deleting, without printing, the image data corresponding to the top page of the document after the thumbnail image is generated;

displaying the generated thumbnail image; and printing the image data corresponding to the to-be-printed pages of the document.

10. A control method for an information processing apparatus for transmitting print information that at least includes plural pages of a document to an image forming apparatus, comprising:

designating to-be-printed pages of the document;

determining whether or not a top page of the document is designated as one of the to-be-printed pages of the document;

setting a top page of the plural pages of the document as a page used for displaying but not printing, thereby causing image data corresponding to the top page to be generated, a thumbnail image to be generated based on the generated image data, and the generated image data to be deleted, without being printed, after the thumbnail image is generated, in a case where it is determined that the top page of the document is not designated as the one of the to-be-printed pages of the document; and transmitting, to the image forming apparatus, the print information including the to-be-printed pages of the document in a case where it is determined that the top page of the document is designated as the one of the to-be-printed pages of the document, and transmitting, to the image forming apparatus, the print information including the to-be-printed pages of the document and the top page of the document set as the page used for displaying but not printing, in the case where it is determined that the top page of the document is not designated as the one of the to-be-printed pages of the document.

11. A control method for an information processing apparatus for transmitting print information that at least includes print data for printing plural pages of a document to an image forming apparatus, comprising:

determining, when at least one page of the document is printed by the image forming apparatus, whether or not reduction layout printing to print plural pages on a single sheet has been designated; and transmitting, in a case where it is determined that the reduction layout printing has been designated, print information that includes to-be-printed pages of the document and a top page of the plural pages of the document, set as a page used for displaying but not for printing, thereby causing image data corresponding to the top page to be generated, a non-reduction layout thumbnail image to be generated based on the generated image data, and the generated image data to be deleted, without being printed, after the non-reduction layout thumbnail image is generated.

12. A non-transitory computer-readable storage medium storing a program to execute a control method for an information processing apparatus for transmitting print information that at least includes plural pages of a document to an image forming apparatus, the method comprising:

designating to-be-printed pages of the document;

determining whether or not a top page of the document is designated as one of the to-be-printed pages of the document;

setting a top page of the plural pages of the document as a page used for displaying but not printing, thereby causing image data corresponding to the top page to be generated, a thumbnail image to be generated based on the generated image data, and the generated image data to be deleted, without being printed, after the thumbnail image is generated, in a case where it is determined that the top page of the document is not designated as the one of the to-be-printed pages of the document; and transmitting, to the image forming apparatus, the print information including the to-be-printed pages of the document in a case where it is determined that the top page of the document is designated as the one of the to-be-printed pages of the document, and transmitting, to the image forming apparatus, the print information including the to-be-printed pages of the document and the top page of the document set as the page used for displaying but not printing, in the case where it is determined that the top page of the document is not designated as the one of the to-be-printed pages of the document.

13. A non-transitory computer-readable storage medium storing a program to execute a control method for an information processing apparatus for transmitting print information that at least includes print data for printing plural pages of a document to an image forming apparatus, the method comprising:

determining, when at least one page of the document is printed by the image forming apparatus, whether or not reduction layout printing to print plural pages on a single sheet has been designated; and transmitting, in a case where it is determined that the reduction layout printing has been designated, print information that includes to-be-printed pages of the document and a top page of the plural pages of the document, set as a page used for displaying but not for printing, thereby causing image data corresponding to the top page to be generated, a non-reduction layout thumbnail image to be generated based on the generated image data, and the generated image data to be deleted, without being printed, after the non-reduction layout thumbnail image is generated.

* * * * *